Jan. 23, 1968   A. FISCHER   3,364,808
EXPANSION ANCHOR
Filed Feb. 17, 1966
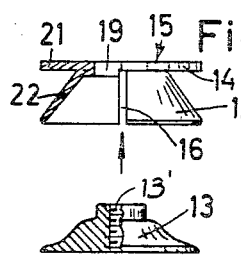
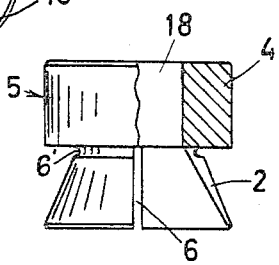
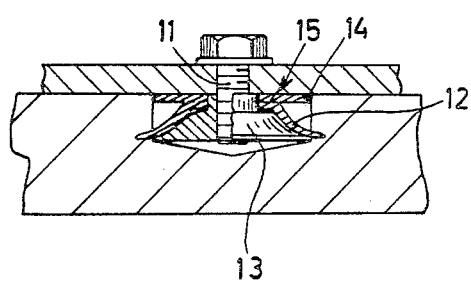
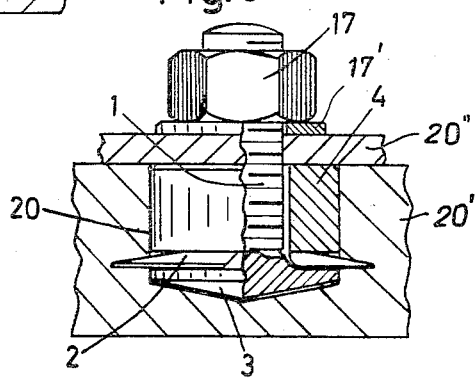
*INVENTOR.*
*ARTUR FISCHER*
BY
Michael J. Striker United States Patent Office 3,364,808
Patented Jan. 23, 1968

3,364,808
EXPANSION ANCHOR
Artur Fischer, Tumlingen, Kreis Freudenstadt,
Germany
Filed Feb. 17, 1966, Ser. No. 528,239
Claims priority, application Germany, Mar. 2, 1965,
F 45,403
9 Claims. (Cl. 85—74)

ABSTRACT OF THE DISCLOSURE

An expansion anchor includes a sleeve member which is adapted to be received in a hole in a support structure. The sleeve member includes a rear portion and an expansible front portion. An expander member is arranged to be placed into the hole ahead of the front portion of the sleeve member. A displacing means is provided for displacing one of the members in the hole with reference to the other so that the expander member engages and expands the front portion of the sleeve member.

The present invention relates to an expansion anchor. More specifically, the invention relates to an expansion anchor which is particularly suitable for use in blind expansion anchor holes. Still more particularly, the invention relates to an expansion anchor which has special utility for use in blind expansion anchor holes which are provided in soft or relatively soft materials.

Expansion anchors of many different types are known in the art. Generally speaking, such anchors are fully useful for their intended purposes, namely to secure objects to walls and other structures. However, all expansion anchors currently known to me are of the type which either requires a relatively deep expansion anchor hole and can therefore be used only in walls of considerable thickness, or the type which can be used with thinner walls but only if the wall is completely penetrated so as to allow a portion of the expansion anchor to expand rearwardly of the wall. In other words, there are currently no expansion anchors which can be used with relatively thin walls, such as panels of wallboard, and which do not require complete penetration of the structure to which they are to be secured.

Furthermore, the type of expansion anchor which is received in a blind bore in a wall structure of relatively great thickness, and whose expansible sleeve generally consists of plastic material, is made to frictionally engage the material surrounding the expansion anchor hole. Thus it is not possible to scale down prior-art expansion anchors of this type so as to allow their use with thin wall structures since, if the anchor hole is not deep enough, the friction obtained by pressing of the expansion anchor against the surrounding wall material of the wall is not adequate to retain the anchor in its anchoring hole. It will be understood, of course, that this discussion encompasses not only application of such expansion anchors for use with wall structures specifically, but for use in "walls" in the broad sense which would include, for example, panel-type doors and the like.

It is therefore a general object of the present invention to provide an expansion anchor which is not possessed of the disadvantages outlined with respect to the prior art.

A more specific object of the invention is to provide such an expansion anchor which is particularly useful in connection with structural members having relatively small thickness.

A further object of the invention is to provide such an anchor which will reliably engage the material surrounding an anchor hole in which it is received.

Still another object of the invention is to provide an anchor of the type outlined above, which is suitable particularly for use in structural members made of soft or relatively soft material, such as for example wallboard.

In accordance with one feature of my invention I provide an expansion anchor, particularly an expansion anchor suitable for use in an expansion anchor hole provided in a structure of relatively soft, brittle or otherwise yieldable material. This expansion anchor may comprise a sleeve member which is adapted to be received in the hole and which includes a rear portion and an expansible front portion. It further comprises an expander member adapted to be placed in the hole forwardly of the front portion of the sleeve. Finally, I provide means for displacing one of the members in the hole with reference to the other so that the expander member engages the front portion of the sleeve and expands the same outwardly into engagement with the material surrounding the hole.

A further feature of my invention is that expansion of the expansible front portion of the sleeve member is accomplished in such manner that parts of this front portion will penetrate the material surrounding the expansion anchor hole, so that the expansion anchor is thereby reliably secured in the expansion anchor hole. This assures that the expansion anchor is maintained in its hole even against the influence of strong axial dislocating forces and, since there is no reliance on mere frictional engagement with the material surrounding the hole, it further assures that the expansion anchor will be reliably maintained in its position despite the relatively small depth of the expansion anchor holes in which the anchor is intended to be used.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partially sectioned elevational view of a sleeve for use with the novel expansion anchor;

FIG. 2 is an elevational view of an expander member and means for displacing the expander member with respect to the sleeve;

FIG. 3 is a partly sectioned elevational view showing the novel expansion anchor whose components are illustrated in FIGS. 1 and 2, received in an expansion anchor hole in a structural member;

FIG. 4 is a partially sectioned elevational view of a further embodiment of a sleeve member constituting a part of the novel expansion anchor;

FIG. 5 is a bottom-plan view of the embodiment shown in FIG. 4;

FIG. 6 is a partially sectioned elevational view of a modified expander member for use with the sleeve member shown in FIG. 4; and FIG. 7 shows the sleeve and expander members of FIGS. 4–6 in a partially sectioned elevational view and received in an expansion anchor hole.

Discussing now the drawing in detail, and firstly FIGS. 1–2 thereof, it will be seen that the novel expansion anchor in the embodiment shown in these figures comprises a sleeve 5 and an expander member 3 carrying an externally threaded stem 1. The sleeve 5 may be made of various different materials, a plastic material being preferred, and comprises an annular rear portion 4 having a central passage 18 and carrying on its front face a projecting outwardly flaring skirt-shaped front portion having over at least a substantial portion of its axial length outwardly flaring inner and outer faces. This outwardly flaring skirt-shaped front portion is formed with a plurality of angularly spaced axial slots 6 dividing the front portion into a plurality of radially expansible outwardly flaring tongues or wings 2, each of which is inclined to the axis of the sleeve 5. Although other configurations are possible the configuration shown in FIG. 1 is preferred, namely the front portion is a frustoconical shape and has an inner and an outer diameter which diverge in direction away from the rear portion 4.

The expander member shown in FIG. 2 is provided in form of a plate-shaped portion 3 having a conically tapering surface 3'. Of course, it is not essential that the surface 3' be of conical configuration since a flat plate 3 would also expand the wings 2 of the front portion of sleeve 5. However, the conical configuration of the surface 3' is preferred in that it does facilitate proper alignment of the member 3 within the front portion of sleeve 5. In the embodiment of FIG. 2 there is shown an externally threaded stem 1 which is integral with the expander member 3 and, as will be evident from FIG. 3, the stem 1 is passed through the aperture of the front portion and through the passage 18 of the rear portion 4 of sleeve 5 until the member 3 lightly engages the front edges of the wings 2. The expansion anchor is then inserted in this condition into an expansion anchor hole 20 in a structural member 20' to which an auxiliary element 20" is to be secured. A nut 17 is threaded onto the externally threaded stem 1, advantageously after a washer 17' has been interposed between the element 20" and the nut 17. Tightening of the nut 17 will move the member 3 relative to the front portion of the sleeve 5 and will thus spread the wings 2 of the sleeve 5 apart in radial direction, as shown in FIG. 3. If the material of the structural element 20' is soft or relatively soft, the wings 2 will penetrate it as shown in FIG. 3, and the expansion anchor will thereby be reliably secured in the expansion anchor hole 20.

To facilitate spreading of the wings 2 in radial direction, a groove 6' may be provided which annularly encircles the front portion at the juncture of the latter with the rear portion 4 of sleeve 5. Furthermore, to further facilitate radial expansion of the wings 2 while preventing axial deflection of the same, it is advantageous to have the wall thickness of the wings 2 taper from the rear, that is from the point at which they are integral with the rear portion 4, towards the front edge of the front portion.

The embodiment of FIGS. 4-7 differs from that of FIGS. 1-3 largely in the different configuration of the rear portion of the sleeve, and in the absence of an integral stem on the expander member. The sleeve in FIG. 4 is indicated with reference numeral 15 and it will be seen that the rear portion 14 thereof is much thinner than the rear portion 4 of sleeve 5 in FIG. 1. In fact, the rear portion 14 of sleeve 15 in FIG. 4 is simply a disc which carries the front portion which latter is axially slotted, as indicated with reference numeral 16, and is thus subdivided into the wings 12 of which in the embodiment of FIG. 4 there are assumed to be four, as shown more clearly in FIG. 5. The rear portion 14 is provided with a central aperture 19 corresponding to the aperture 18 in FIG. 1. The edge face of the rear portion 14, as well as the external surface of the wings 12, may be provided with axially extending serrations, circumferential grooves and projections, or be provided with a surface which is roughened in some similar manner, as indicated at 21 and 22, so as to provide better frictional engagement with the material surrounding the expansion anchor hole.

FIG. 6 shows the expander member 13 which corresponds largely to the member 3 of FIG. 2. Contrary to the latter, however, the member 13 of FIG. 6 does not have an integral stem, such as the stem 1 of FIG. 2. Rather, the expander member 13 is provided with a central bore or passage 13' which is internally screw-threaded. In use, members 15 and 13 will be inserted into an expansion anchor hole, the member 13 being first to be inserted and the sleeve 15 then following thereafter. An externally screw-threaded bolt or similar member, such as the bolt 11 indicated in FIG. 7, is then inserted from outside the hole through the passage 19 until its screw-threads mesh with the internal threads of the central passage 13' of the expander member 13. Rotation of the bolt 11 in a sense tending to cause the same to penetrate deeper into the passage 13' of expander member 13, will cause the latter to be displaced with reference to the front portion of sleeve 15. The result is the radial spreading of the wings 12 and their penetration into the material of the structural member in which the expansion anchor hole is provided. As a result of this penetration the expansion anchor will be reliably secured in the expansion anchor hole, even if the bolt 11 is subsequently removed.

Of course, it will be understood that various different materials are suitable for the novel expansion anchor herein described. Thus, plastic material may be used for all of the components, or plastic material may be used for some of the components, such as the sleeve, whereas metal may be used for the other components, for example the integral expander 3 and stem 1 in FIG. 2. Again, the entire expansion anchor can be made of metallic material. It will also be understood that the roughened surfaces provided on the rear portion 14 and the front portion, as indicated at reference numerals 21 and 22, are particularly suitable for preventing rotation of the sleeve 15 in the expansion anchor hole as well as to further provide assurance against its axial withdrawal from the hole, thus reinforcing the holding effect of the wings 12. Of course, such projections can also be provided on the embodiment shown in FIGS. 1-3.

It will be understood that each of the elements described above, or two or more together, may also find a useful application in other types of an expansion anchor differing from the types described above.

While the invention has been illustrated and described as embodied in an expansion anchor which is particularly suitable for use in expansion anchor holes provided in structures of relatively soft materials, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range or equivalence of the following claims.

What is claimed as new and desired to be secured by Letters Patent is:

1. An expansion anchor, particularly for use in an expansion anchor hole provided in a structure of relatively soft material, comprising a sleeve member adapted to be received in said hole and including a centrally apertured substantially disk-shaped annular rear portion and an expansible outwardly flaring skirt-shaped front portion diverging in the direction away from said rear portion, said skirt-shaped front portion being attached to said rear portion radially inwardly of the outer periphery of said rear portion and adjacent said central aperture, said skirt-portion having over at least a substantial portion of its axial length a plurality of angularly spaced axial slots dividing said outwardly flaring skirt-shaped front portion into a plurality of outwardly flaring radially expansible tongues, each of which is inclined to the axis of said sleeve member; an expander member adapted to be placed in said hole forwardly of said front portion of said sleeve member; and displacing means for displacing one of said members in said hole with reference to the other, whereby said expander member engages said front portion of said sleeve member and radially expands said outwardly flaring tongues into engagement with the material surrounding said hole.

2. An expansion anchor as defined in claim 1, wherein said displacing means comprises an externally threaded stem rigid with said expander member, and a nut adapted to be located outside said hole and to mesh with said stem.

3. An expansion anchor as defined in claim 1, wherein a side of said expander member facing said front portion is of substantially conical configuration.

4. An expansion anchor as defined in claim 1, wherein said rear portion of said sleeve member has a maximum diameter which is at most equal to the maximum diameter of said front portion whereby said sleeve member is receivable in its entirety in said hole.

5. An expansion anchor as defined in claim 1, wherein said rear portion is provided with a roughened circumferential surface.

6. An expansion anchor as defined in claim 1, wherein the wall thickness of said front portion tapers in direction away from said rear portion.

7. An expansion anchor as defined in claim 6, wherein said front portion is provided adjacent its juncture with said rear portion with a circumferentially extending groove for facilitating the radial expansion of said tongues of said front portion.

8. An expansion anchor as defined in claim 1, wherein said expander member is provided with screw threads; and wherein said means comprises an elongated screw-threaded member having a front portion adapted to mesh with the screw-threads of said expander member.

9. An expansion anchor as defined in claim 8, wherein said elongated member has a rear portion adapted to be located outside said hole when said front portion meshes with said expander member; and further comprising a nut adapted to mesh with the screw threads of said rear portion.

References Cited
UNITED STATES PATENTS

| | | | |
|---|---|---|---|
| 976,096 | 11/1910 | Pansch et al. | 85—75 |
| 1,019,723 | 3/1912 | Pauli | 85—77 |
| 2,031,325 | 2/1936 | Meyer | 85—74 |
| 2,156,338 | 5/1939 | Heyner et al. | 85—75 |
| 2,686,547 | 8/1954 | Becker | 85—74 |
| 2,955,504 | 10/1960 | Lovrinch et al. | 85—75 |
| 3,089,377 | 5/1963 | Engstrom | 85—72 |

FOREIGN PATENTS

| | | |
|---|---|---|
| 634,116 | 3/1950 | Great Britain. |
| 743,651 | 1/1956 | Great Britain. |

MARION PARSONS, Jr., *Primary Examiner.*